US009477544B2

(12) United States Patent
Wu et al.

(10) Patent No.: US 9,477,544 B2
(45) Date of Patent: Oct. 25, 2016

(54) RECOMMENDING A SUSPICIOUS COMPONENT IN PROBLEM DIAGNOSIS FOR A CLOUD APPLICATION

(71) Applicant: International Business Machines Corporation, Armonk, NY (US)

(72) Inventors: Hai S. Wu, Beijing (CN); Meng Ye, Beijing (CN); Tao Yu, Hong Kong (CN)

(73) Assignee: International Business Machines Corporation, Armonk, NY (US)

( * ) Notice: Subject to any disclaimer, the term of this patent is extended or adjusted under 35 U.S.C. 154(b) by 127 days.

(21) Appl. No.: 14/591,031

(22) Filed: Jan. 7, 2015

(65) Prior Publication Data

US 2015/0199226 A1 Jul. 16, 2015

(30) Foreign Application Priority Data

Jan. 16, 2014 (CN) .......................... 2014 1 0019532

(51) Int. Cl.
*G06F 11/00* (2006.01)
*G06F 11/07* (2006.01)
(Continued)

(52) U.S. Cl.
CPC ......... *G06F 11/079* (2013.01); *H04L 41/0677* (2013.01); *H04L 41/5019* (2013.01); *H04L 43/0829* (2013.01)

(58) Field of Classification Search
CPC ...................... H04L 41/0677; H04L 41/5019
USPC ...... 714/26, 27, 38.1, 39, 41, 47.1; 717/124, 717/125, 126
See application file for complete search history.

(56) References Cited

U.S. PATENT DOCUMENTS 7,437,611 B2    10/2008  Agarwal et al.
8,140,905 B2     3/2012  Beaty et al.
(Continued)

FOREIGN PATENT DOCUMENTS

WO    WO2004/025471 A2    3/2004
WO    WO2013/072232 A1    5/2013

OTHER PUBLICATIONS

Chen, Mike Y. et al., "Pinpoint: Problem Determination in Large, Dynamic Internet Services", 2002 International Conference on Dependable Systems and Networks (DSN 2002), http://www.cs.berkeley.edu/~brewer/papers/ipds2002_pinpoint.pdf, Bethesda, MD, Jun. 23-26, 2002, 10 pages.
(Continued)

*Primary Examiner* — Dieu-Minh Le
(74) *Attorney, Agent, or Firm* — Francis Lammes; Stephen J. Walder, Jr.; Joseph Petrokaitis

(57) ABSTRACT

The present invention discloses a method and an apparatus for recommending a suspicious component in problem diagnosis for a cloud application. In the method, firstly a graph data model representing a hierarchical structure of the cloud application is constructed, wherein the graph data model comprises an application node representing the cloud application, a plurality of component nodes representing a plurality of components of the cloud application, and inter-node lines indicating inter-node relationships. Then real-time information of the cloud application is obtained, in response to detecting performance degradation of the cloud application. Impact degrees of the plurality of component nodes on the performance degradation of the cloud application is obtained based on the constructed graph data model and the obtained real-time information, and a suspicious component sequence is generated according to the impact degrees of the plurality of component nodes.

22 Claims, 8 Drawing Sheets

(51) Int. Cl.
*H04L 12/24* (2006.01)
*H04L 12/26* (2006.01)

(56) References Cited

U.S. PATENT DOCUMENTS

| | | | |
|---|---|---|---|
| 8,161,058 B2 | 4/2012 | Agarwal et al. | |
| 8,302,079 B2 | 10/2012 | Bansal | |
| 8,521,501 B2 | 8/2013 | Alam et al. | |
| 2012/0330895 A1* | 12/2012 | Chavda | G06F 17/30017 707/634 |
| 2013/0263079 A1* | 10/2013 | Schiessl | G06F 8/20 717/101 |
| 2014/0053025 A1* | 2/2014 | Marvasti | G06F 11/079 714/37 |
| 2014/0172371 A1* | 6/2014 | Zhu | G06F 11/0709 702/185 |
| 2014/0189637 A1* | 7/2014 | Wu | G06F 8/35 717/105 |
| 2015/0082432 A1* | 3/2015 | Eaton | H04L 47/785 726/23 |

OTHER PUBLICATIONS

Kiciman, Emre et al., "Root cause localization in large scale systems", Proceedings of the First Workshop on Hot Topics in System Dependability (HotDep), Jun. 2005, 6 pages.

Reitbauer, Alois et al., "Performance Analysis and Resolution of Cloud Applications", Compuware Corporation, Chapter: Virtualization and Cloud Performance, http://javabook.compuware.com/content/cloud/performance-analysis-and-resolution-and-a-cloud.aspx, Published Feb. 2011, 6 pages.

Sharma, Bikash et al., "CloudPD: Problem Determination and Diagnosis in Shared Dynamic Clouds", Pennsylvania State University, IBM Research India, Technical Report CSE-12-002, May 2012, 30 pages.

\* cited by examiner

RECOMMENDING A SUSPICIOUS COMPONENT IN PROBLEM DIAGNOSIS FOR A CLOUD APPLICATION

BACKGROUND

The present invention relates to technologies of problem diagnosis for a cloud application, and more specifically, to recommending a suspicious component in problem diagnosis for a cloud application.

In the problem diagnosis for a cloud application, it is very important how to find a root cause of a cloud application problem fast and accurately. In a cloud computing environment, execution of the cloud application involves many components, such as a proxy server, an application server, a database, a virtual machine, etc. Any component having a problem will lead to performance degradation of the cloud application.

At present, the problem diagnosis for the cloud application is generally performed by a system administrator manually. That is, when the performance of the cloud application degrades, the system administrator determines a possible problem component according to his experience, and performs root cause analysis for the problem component utilizing a specific problem diagnosis tool. However, such problem diagnosis requires higher expertise of the system administrator. Furthermore, in the cloud computing environment, many components are required for the execution of the cloud application, and these components affect each other and may be set with different alert rules. When the performance of the cloud application degrades, a plurality of components may all give an alarm, which leads to difficulty in determining the problem component for the system administrator, therefore the root cause cannot be determined fast and accurately.

Additionally, most existing problem diagnosis tools focus on specific components. Therefore, it is required to determine which problem diagnosis tool will be utilized for which component before the root cause analysis. However, in the prior art, the process is generally completed by an expert with higher expertise.

Therefore, the process of problem diagnosis of the cloud application may include two phases. In the first phase, it is determined which component has a problem; in the second phase, the root cause analysis for the component is performed by utilizing a specific problem diagnosis tool. However, in the prior art, there is not any technology in which a user's lack of expertise is guided to perform diagnosis starting from which component or in which a component that needs to be diagnosed is recommended, when the performance of the cloud application degrades.

In one illustrative embodiment, a method for recommending a suspicious component in problem diagnosis for a cloud application is provided. The illustrative embodiment constructs a graph data model representing a hierarchical structure of the cloud application. In the illustrative embodiment, the graph data model comprises an application node representing the cloud application, a plurality of component nodes representing a plurality of components of the cloud application, and inter-node lines indicating inter-node relationships. The illustrative embodiment obtains real-time information of the cloud application, in response to detecting performance degradation of the cloud application. The illustrative embodiment obtains impact degrees of the plurality of component nodes on the performance degradation of the cloud application, based on the graph data model and the real-time information. The illustrative embodiment generates a suspicious component sequence, according to the impact degrees of the plurality of component nodes.

In other illustrative embodiments, a system/apparatus is providect The system/apparatus may comprise one or more processors and a memory coupled to the one or more processors. The memory may comprise instructions that, when executed by the one or more processors, cause the one or more processors to perform various ones of, and combinations of, the operations outlined above with regard to the method illustrative embodiment.

In yet another illustrative embodiment, a computer program product comprising a computer useable or readable medium having a computer readable program is provided. The computer readable program, when executed on a computing device, causes the computing device to perform various ones of, and combinations of, the operations outlined above with regard to the method illustrative embodiment.

These and other features and advantages of the present invention will be described in, or will become apparent to those of ordinary skill in the art in view of the following detailed description of the example embodiments of the present invention.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
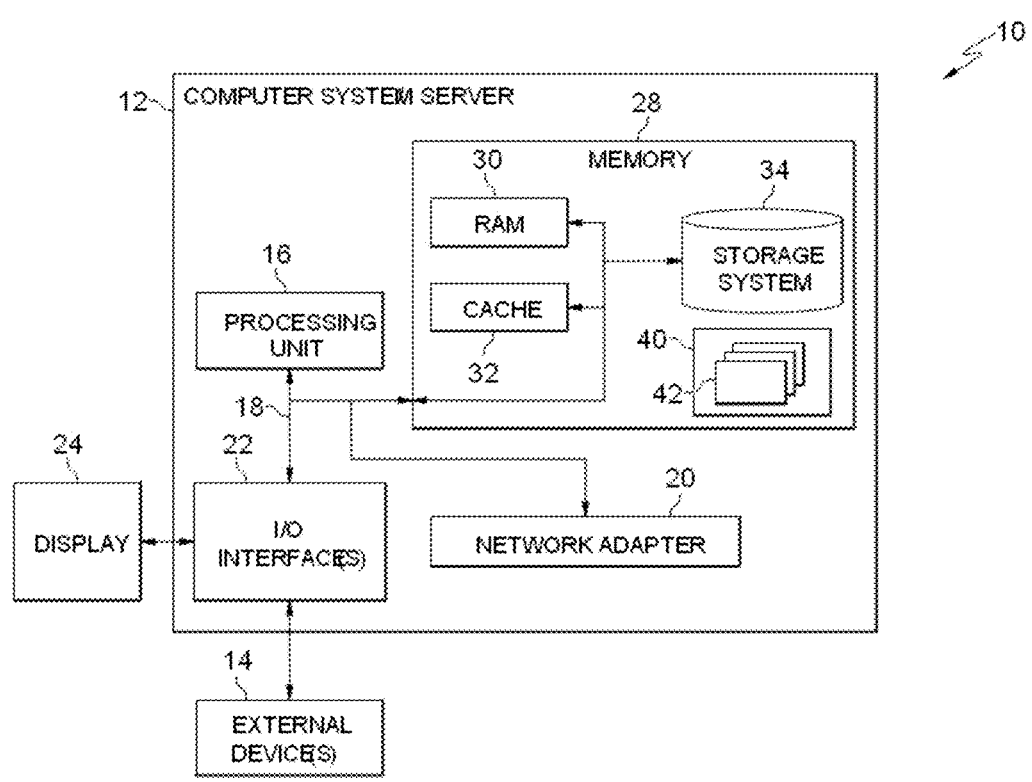
FIG. 1 depicts a cloud computing node according to an embodiment of the present invention.

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or tater developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models, Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure, The applications are accessible from various client devices through a thin client interface such as a web browser web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types, Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 cat be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
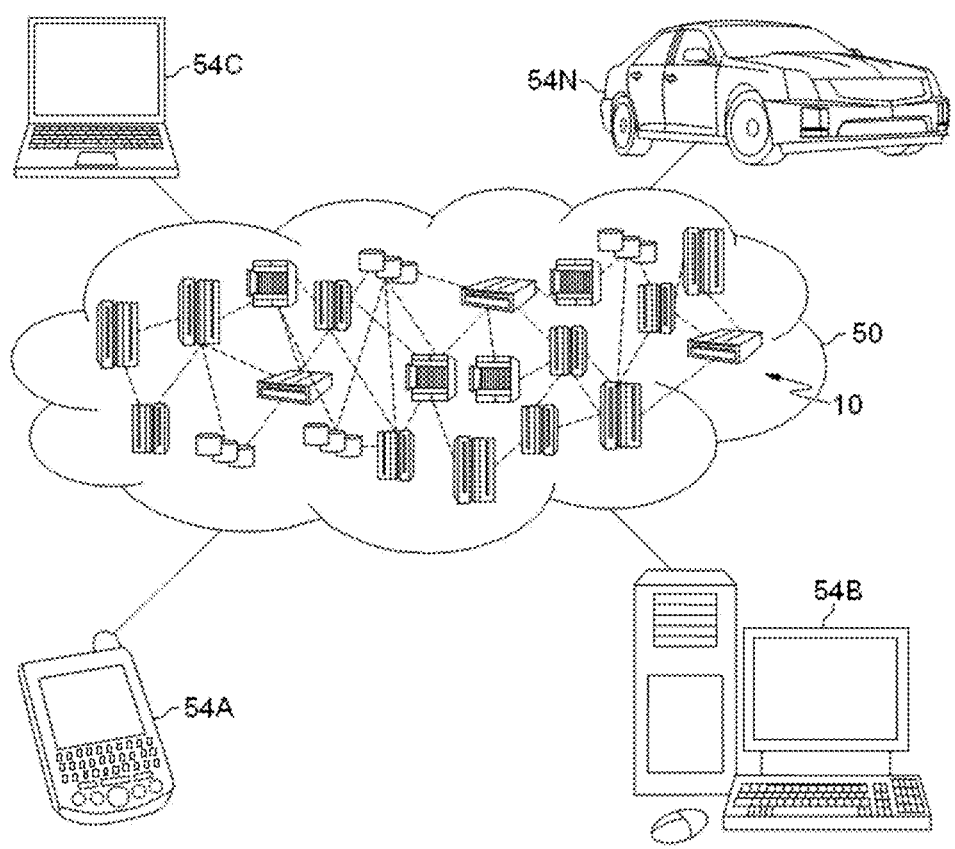
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
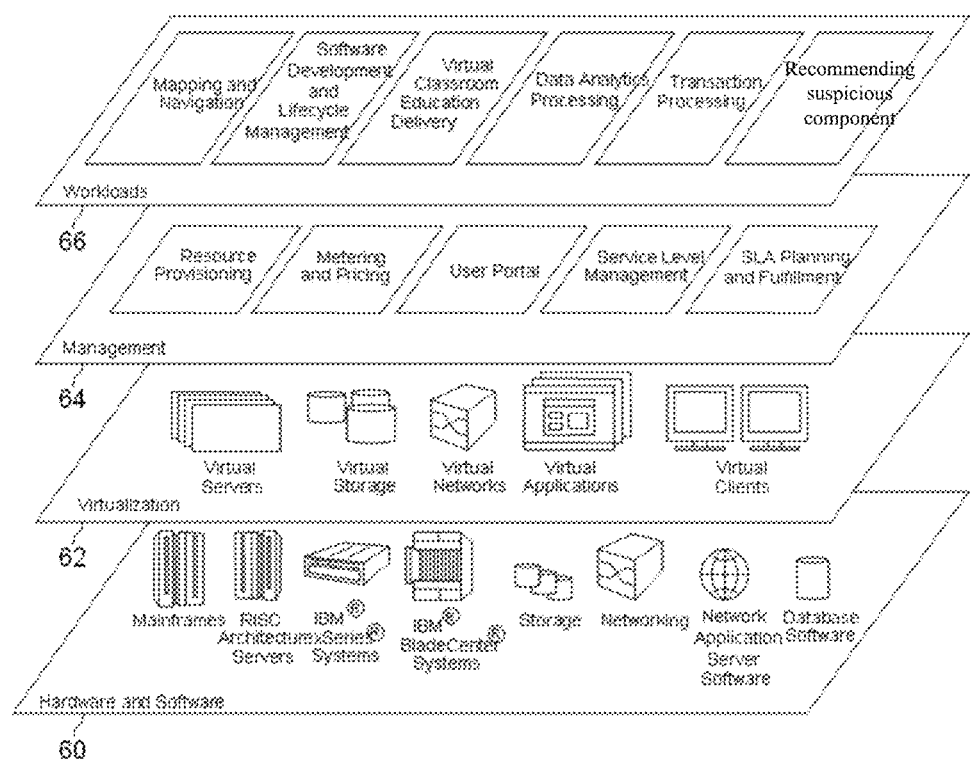
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software, (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment, Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and recommendation of a suspicious component in problem diagnosis for a cloud application.

Figure 4:
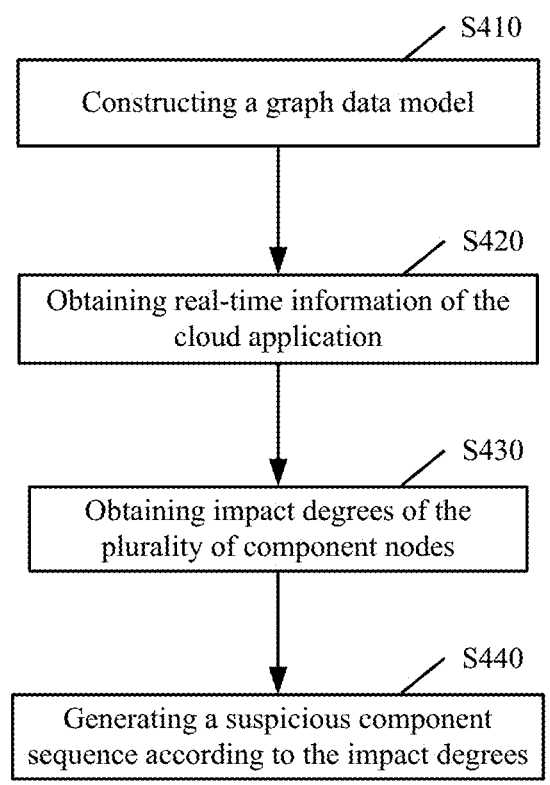
FIG. 4 is a flowchart of the method for recommending a suspicious component in problem diagnosis for a cloud application according to an embodiment of the present invention.

FIG. 4 is a flowchart of the method for recommending a suspicious component in problem diagnosis for a cloud application according to an embodiment of the present invention. The embodiment is described in detail below in combination with accompanying drawings.

As shown in FIG. 4, in step S410, a graph data model representing a hierarchical structure of a cloud application is constructed. As described above, in the cloud computing environment, the cloud application may be distributed on a plurality of components in different layers. In this embodiment, the graph data model is constructed by modeling the cloud application to depict a hierarchical structure of the cloud application graphically. Therefore, the graph data model in this embodiment is a cloud application centric topology.

In this embodiment, the graph data model comprises an application node representing the cloud application, a plurality of component nodes representing a plurality of components of the cloud application, and inter-node lines indicating inter-node relationships. The hierarchical structure of the cloud application may include an application layer, a middleware layer, a virtual machine layer, a hypervisor layer and a network layer. Accordingly, the graph data model also includes these layers. The application node and the component node are located in different layers. The application node is located in the application layer. The component node representing the component such as a proxy server, an application server and a database is located in the middleware layer. Relationships between the application node and the component node and between a plurality of component nodes may be indicated by the inter-node lines. In one example, the inter-node relationships may comprise at least one of a parent-child relationship for inter-layer nodes, a prior/next relationship and a peer relationship for intra-layer nodes. Generally, for the inter-layer nodes, a node located in an upper layer is a parent node, and a node located in a tower layer is a child node. For the intra-layer nodes, the prior/next relationship and/or the peer relationship may be determined according to a procedure of handling a transaction in the cloud application.

Figure 5:
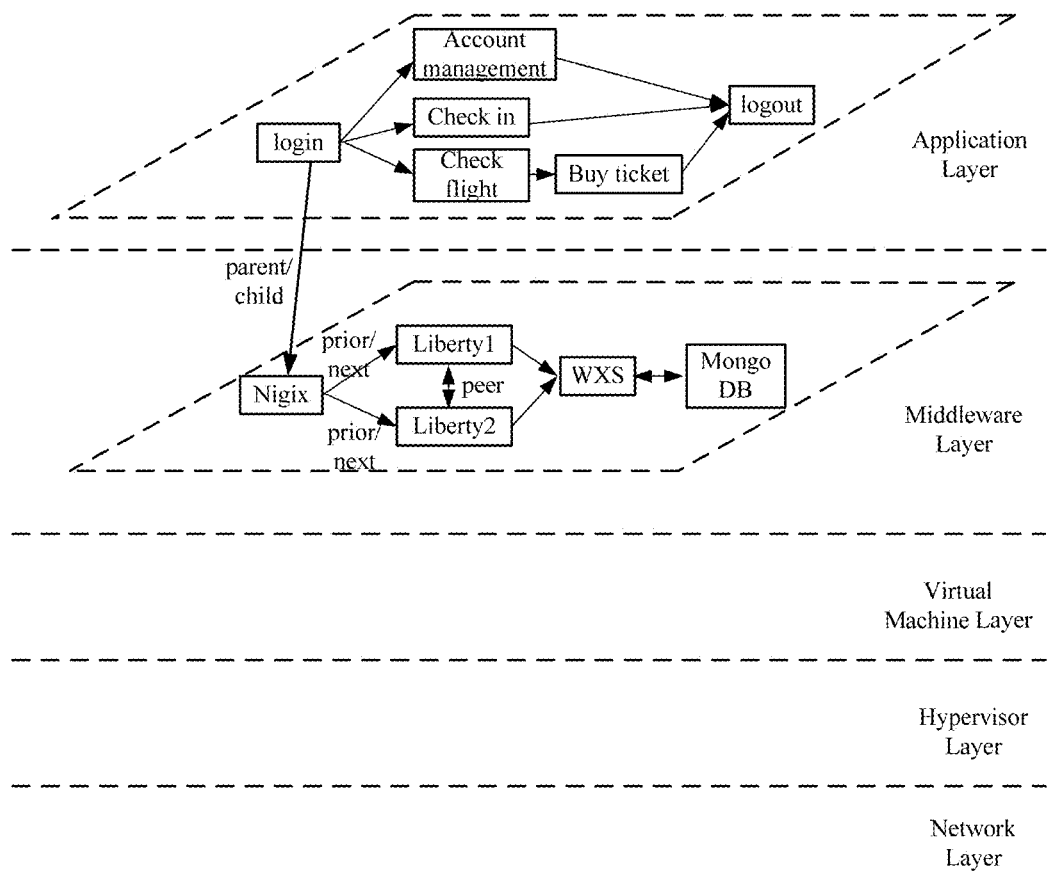
FIG. 5 is a schematic diagram of an example of a graph data model representing a hierarchical structure of a cloud application according to embodiments of the present invention.

FIG. 5 illustrates an example of the graph data model representing the hierarchical structure of the cloud application according to embodiments of the present invention. It is assumed that the cloud application is login management of a website of an airline company. As shown in FIG. 5, in the application layer, the application node is "login". In the middleware layer, the component nodes of the application node "login" include the component node Nigix representing a proxy server, the component nodes Liberty1, Liberty2, WXS representing application servers and the component node MongoDB representing a database. Additionally, although not shown, the virtual machine layer, the hypervisor layer and the network layer also include the corresponding component nodes. There is a parent-child relationship between the application node "login" located in the application layer and the component node Nigix located in the middleware layer, and there is a prior/next relationship between the component nodes Nigix and Liberty 1, Liberty 2 respectively in the middleware layer, and there is a peer relationship between the component nodes Liberty1 and Liberty2, etc.

Back to FIG. 4, in step S420, real-time information of the cloud application is obtained in response to detecting performance degradation of the cloud application. Generally, the performance of the cloud application may be represented by a performance index of end user experience (EUE), such as response time, packet loss rate, etc. It may be considered that the performance of the cloud application degrades if the response time becomes longer or the packet loss rate increases. In this embodiment, the real-time information of the cloud application is a collection of the real-time information of the component nodes of the cloud application, wherein the real-time information may include transaction information and running status information. Furthermore, the real-time information of the component nodes may also be depicted in the graph data model constructed in the step S410.

Figure 6:
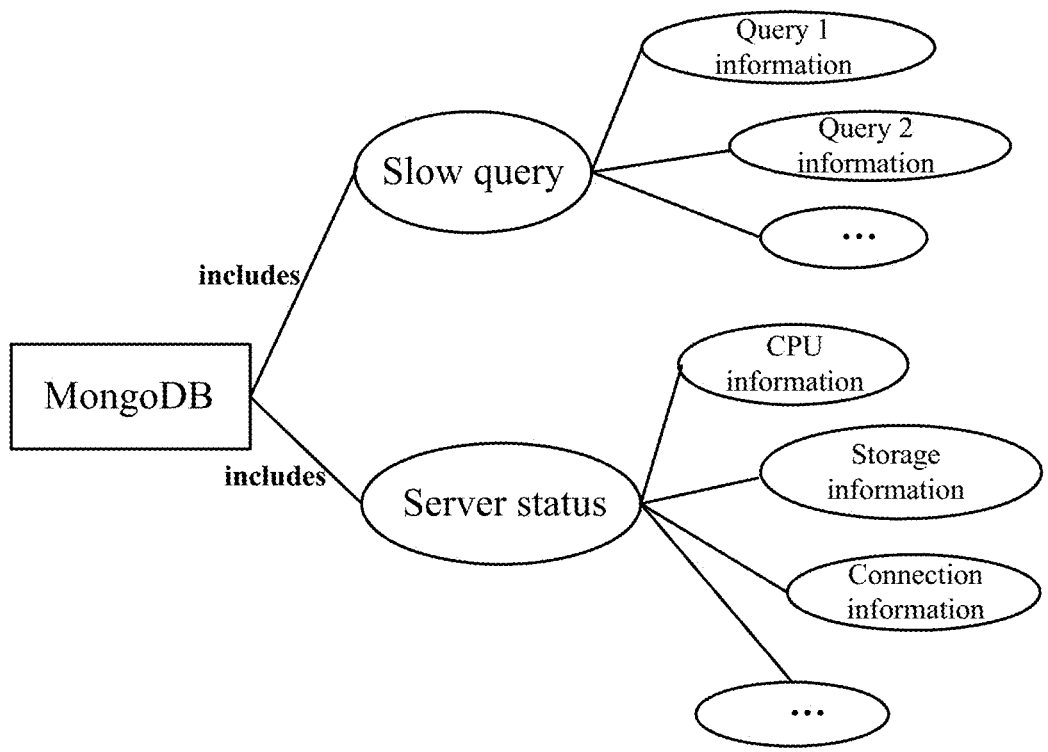
FIG. 6 is a schematic diagram of an example of real-time information of a database component according to embodiments of the present invention.

FIG. 6 illustrates a schematic diagram of an example of the real-time information of the database node MongoDB. As shown in FIG. 6, the real-time information of MongoDB includes slow query information (i.e. the transaction information) and server status information (i.e. the running status information). The slow query information includes, for example, a metric of each slow query and its value, and the server status information includes, for example, CPU information, storage information, connection information, etc. Different real-time information may be set for different component nodes.

The real-time information of the component node may be recorded in a log periodically. When the performance degradation of the cloud application is detected, the real-time information may be Obtained from the log of each component node.

Then, back to FIG. 4, in step S430, impact degrees of the plurality of component nodes on the performance degradation of the cloud application is obtained, based on the graph data model constructed in the step S410 and the real-time information obtained in the step S420.

In this embodiment, the impact degree of the component node on the performance degradation of the cloud application means a contribution of the component node to the performance degradation, which may reflect the possibility of the component node having a problem.

Figure 7:
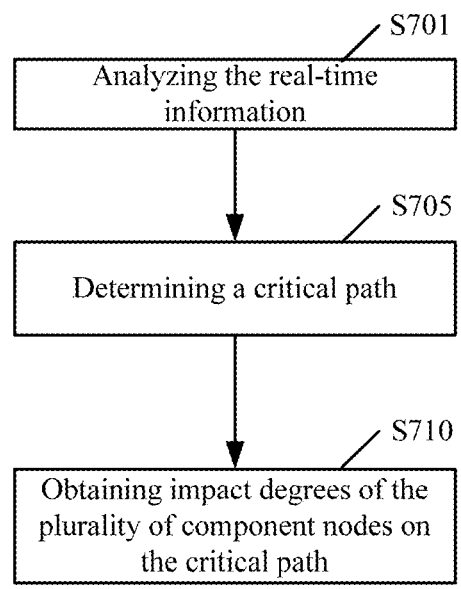
FIG. 7 is a schematic flowchart illustrating Obtaining impact degrees of a plurality of components on performance degradation of the cloud application in the embodiment of FIG. 4.

FIG. 7 illustrates a schematic flowchart of the step S430. As shown in FIG. 7, firstly, in step S701, the real-time information obtained in step S420 is analyzed to obtain a problem transaction with the worst performance index in the cloud application. In this embodiment, the problem transaction may be determined according to transaction information of the proxy server node, which is the component node. Specifically, the transaction information of the proxy server node may be extracted from the obtained real-time information, and the problem transaction may be determined according to the extracted transaction information of the proxy server node. The transaction information of the proxy server node may include performance parameters of all transactions passing through the proxy server node, such as response time, etc.

In the process of determining the problem transaction, the response time of each transaction may be obtained from the transaction information of the proxy server node, and then the response time of the respective transactions is compared with each other obtain the transaction with the longest response time. In the case that the performance index is the response time, it is considered that the longer the response time is, the greater the likelihood of the corresponding transaction having a problem is. Therefore the transaction with the longest response time is determined as the problem transaction.

In another embodiment, in the process of determining the problem transaction, firstly the response time of each transaction is obtained from the transaction information of the proxy server node, and then a ratio of the difference between the response time of the respective transactions and its reference response time to the reference response time is calculated. The reference response time of the transaction may be the standard response time of the transaction, and may also be the average response time obtained by statistics of the historical response time of the transaction. Finally, the transaction with the largest ratio calculated is determined as the problem transaction.

Then, in step S705, a path comprising the component nodes involved in the problem transaction is determined as a critical path according to the graph data model constructed in the step S410. After the determination of the problem transaction, the component nodes involved in the problem transaction may be further determined according to the transaction information of each component node. As described above, the relationships among the components nodes may be reflected in the graph data model, therefore, the path formed by the component nodes through which the problem transaction passes may be determined. In this embodiment, the path, with the application node as an endpoint, including the component nodes involved in the problem transaction, is defined as the critical path.

Then, in step S710, impact degrees of the plurality of component nodes on the determined critical path are obtained as the impact degrees of the plurality of component nodes on the performance degradation of the cloud application. In this embodiment, the impact degree may include a first value indicating an impact of the component node on the critical path and a second value indicating a location of the component node in the graph data model.

In one embodiment, for each component node, the number of paths passing through the determined critical path of at least one path from the component node to the application node is calculated as a first value of the component node. Meanwhile a distance value of the at least one path from the component node to the application node is further calculated. In this embodiment, the distance value of the path may be represented by hops from the component node to the application node. The maximum distance value calculated is taken as a second value of the component node.

In another embodiment, firstly, at least one related component node having the inter-node relationship with the component nodes of the determined critical path is selected. It is considered that the component nodes of the critical path and the related component node are possible to lead to the performance degradation of the cloud application. Then, for each component node in a node set comprising the component nodes of the critical path and the selected related component node, the number of paths passing through the critical path of at least one path from the component node to the application node is calculated as a first value of the component node. Meanwhile, a distance value of the at least one path from the component node to the application node is further calculated, and the maximum distance value calculated is taken as a second value of the component node.

The impact degree of each component node or each related component node on the performance degradation of the cloud application may be obtained by calculating the first value and the second value.

Figure 8:
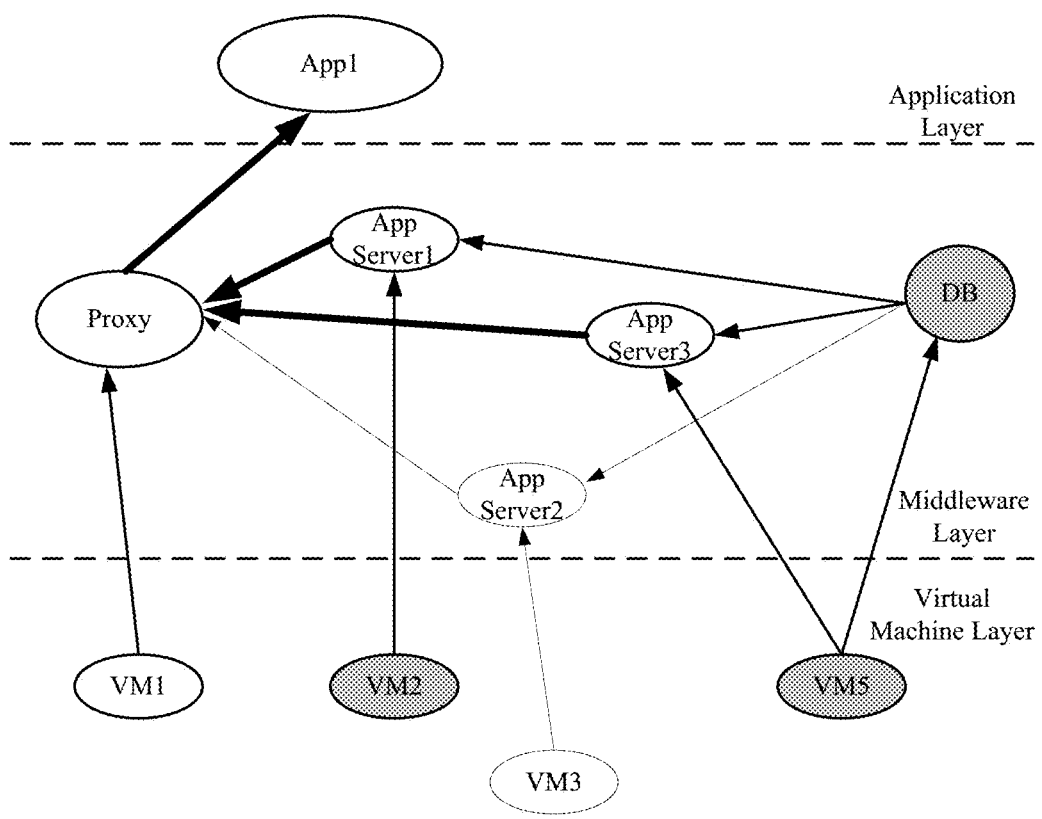
FIG. 8 is a schematic diagram s an example of obtaining impact degrees.

FIG. 8 is a schematic diagram illustrating an example of obtaining impact degrees. In this example, it is assumed that the constructed graph data model of the cloud application comprises an application layer, a middleware layer and a virtual machine layer. As shown in FIG. 8, the application node App1 is located in the application layer, and the proxy server node Proxy, the application server nodes AppServer1, AppServer2, AppServer3 and a database node DB, as the component nodes, are located in the middleware layer, and the virtual machine nodes VM1, VM2, VM3, VM5, as the component nodes, are located in the virtual machine layer. A determined critical path is denoted with heavy solid lines in the figure. It can be seen that the component nodes of the critical path include the proxy server node Proxy and the application server nodes AppServer1, AppServer3, and the related component nodes include the database node DB and the virtual machine nodes VM1, VM2, VM5. The first values and second values of the proxy server node Proxy, the application server nodes AppServer1, AppServer3, the database node DB and the virtual nodes VM1, VM2, VM5 are calculated respectively. It can be obtained that the first value and the second value of the proxy server node Proxy are respectively $V1=1$, $V2=1$, the first value and the second value of the application server node AppServer1 are respectively $V1=1$, $V2=2$, the first value and the second value of the application node AppServer3 are respectively $V1=1$, $V2=2$, the first value and the second value of the database node DB are respectively $V1=2$, $V2=3$, the first value and the second value of the virtual machine node VM1 are respectively $V1=1$, $V2=2$, the first value and the second value of the virtual machine VM2 are respectively $V1=1$, $V2=3$, and the first value and the second value of the virtual machine VM5 are respectively $V1=3$, $V2=4$.

Back to FIG. 4, in step S440, a suspicious component sequence is generated according to the impact degrees of the plurality of component nodes obtained in the step S430. In this step, the suspicious component sequence is generated by sorting the plurality of component nodes in an order of the impact degrees from high to low.

In one embodiment, firstly the component nodes are sorted in descending order according to the first values of the component nodes, to generate a first component sequence. Then, in the first component sequence, the component nodes with the same first value are sorted in descending order according to the second values, to generate a second component sequence. Thus, the second component sequence is taken as the suspicious component sequence.

In another embodiment, firstly the running status information of the plurality of component nodes is extracted from the real-time information obtained in the step S420. As described above, the running status information of the component node includes, for example, CPU information such as CPU utilization, storage information such as utilization of storage space, etc. Then, it is determined whether there is the component node with the running status information exceeding a predefined threshold. Generally, different alert rules are set for the different component nodes, and the rule defines a threshold of the running status information. When the running status information of the component node exceeds the predefined threshold, the component node will give an alarm. In this example, the component node with the running status information exceeding a predefined threshold (hereinafter referred to as "priority component node") will be prioritized. Firstly the priority component nodes are sorted in descending order according to the first value of each priority component node, to generate a first component sequence. Then, in the first component sequence, the priority component nodes with the same first value are sorted in descending order according to the second values, to generate a second component sequence. Then, other component nodes except the priority component nodes are sorted in descending order according to the first values, to generate a third component sequence. Then, in the third component node sequence, the component nodes with the same first value are sorted in descending order according to the second values, to generate a fourth component sequence. Finally, the second component sequence and the fourth component sequence are combined in an order that the second component sequence precedes the fourth component sequence, to generate the suspicious component sequence.

In the example of FIG. 8, assuming that the priority component nodes are the database node DB and the virtual machine nodes VM2, VM5 (denoted with grayscale in the figure), the proxy server node Proxy, the application server nodes AppServer1, AppServer3, the database node DB and the virtual machine nodes VM1, VM2, VM5 are sorted according to the impact degrees, and the obtained suspicious component sequence is {VM5, DB, VM2, AppServer3, AppServer1, VM1, Proxy}, wherein the virtual machine node VM5 is the most suspicious component. The above suspicious component sequence is recommended to the system administrator for further processing.

Although the case in which the impact degree of the component node includes the first value and the second value is described in above embodiments, those skilled in the art can appreciate that the impact degree may also include other values, such as a weight of the layer of the component node, etc.

It can be seen from the above descriptions that the method for recommending a suspicious component in problem diagnosis for a cloud application of the present invention can automatically determine the suspicious component sequence by obtaining the impact degrees of the component nodes of the cloud application on the performance degradation of the cloud application, so as to guide the system administrator to perform root cause analysis starting from which component when the performance degradation of the cloud application is detected, thereby finding root cause of the performance degradation fast and accurately.

Figure 9:
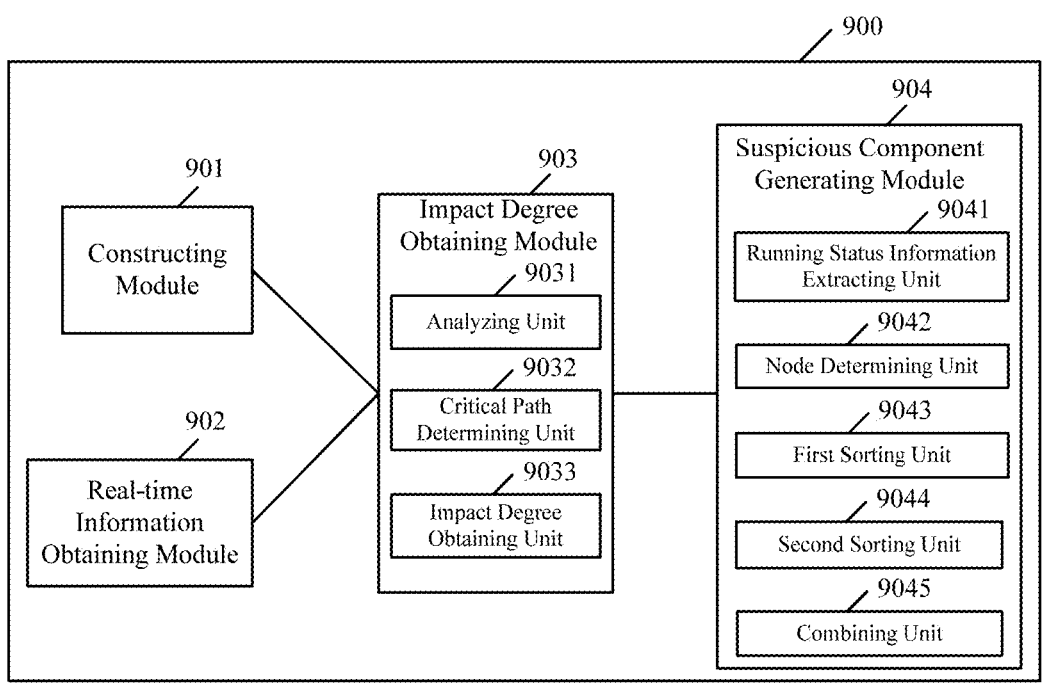
FIG. 9 is a schematic block diagram of the apparatus for recommending a suspicious component in problem diagnosis for a cloud application according to an embodiment of the present invention.

Under the same inventive concept, FIG. 9 illustrates a schematic block diagram of the apparatus 900 for recommending a suspicious component problem diagnosis for a cloud application according to an embodiment of the present invention. This embodiment will be described in detail below in combination with an accompanying drawing, wherein the descriptions of the same parts as those of the above embodiments will be omitted appropriately.

As shown FIG. 9, the apparatus 900 of the embodiment comprises: a constructing module 901, which constructs a graph data model representing a hierarchical structure of the cloud application; a real-time information obtaining module 902, which obtains real-time information of the cloud application, in response to detecting performance degradation of the cloud application; an impact degree obtaining module 903, which obtains impact degrees of the plurality of component nodes on the performance degradation of the cloud application, based on the graph data model constructed by the constructing module 901 and the real-time information obtained by the real-time information obtaining module 902; and a suspicious component generating module 904, which generates a suspicious component sequence, according to the impact degrees of the plurality of component nodes.

As described above, the graph data model may comprise an application node representing the cloud application, a plurality of component nodes representing a plurality of components of the cloud application, and inter-node lines indicating inter-node relationships, and may have a structure corresponding to the hierarchical structure of the cloud application. The relationships between the application node and the component node and between the component nodes may be reflected by the graph data model.

When the performance degradation of the cloud application is detected, the real-time information obtaining module 902 obtains the real-time information of the cloud application, i.e. the real-time information of all component nodes, which may include the transaction information and the running status information of the component node.

Then the impact degree obtaining module 903 obtains the impact degrees of the plurality of component nodes based on the graph data model and the real-time information. In the impact degree obtaining module 903, an analyzing unit 9031 analyzes the real-time information of the cloud application, to obtain a problem transaction with the worst performance index in the cloud application. Specifically, in the analyzing unit 9031, a transaction information extracting unit extracts the transaction information of a proxy server node, which is the component node, from the real-time information, and the problem transaction is determined by a transaction determining unit according to the extracted transaction information of the proxy server node. In this embodiment, the response time is used as the performance index. Therefore, the transaction with the longest response time is determined as the problem transaction.

In one embodiment, in the transaction determining unit, firstly a response time obtaining unit obtains the response time of each transaction from the transaction information of the proxy server node. Then a comparing unit compares the response time of the respective transactions with each other and a determining unit determines the transaction with the longest response time as the problem transaction.

In another embodiment, in the transaction determining unit, a response time obtaining unit obtains the response time of each transaction from the transaction information of the proxy server node, and then a calculating unit calculates a ratio of a difference between the response time of the respective transactions and its reference response time to the reference response time. In this embodiment, the reference response time may be the standard response time of the transaction, or the average response time obtained by statistics of the historical response time of the transaction, Then a determining unit determines that the transaction with the largest ratio is the problem transaction.

After the problem transaction is obtained, a critical path determining unit 9032 determines a path comprising the component nodes involved in the problem transaction according to the graph data model. As described above, the critical path is a path with the application node as one endpoint, which passes through the component nodes of the problem transaction.

Then, an impact degree obtaining unit 9033 obtains the impact degrees of the plurality of component nodes on the critical path, as the impact degrees of these component nodes on the performance degradation of the cloud application. In this embodiment, as described above, the impact degree may include the first value and the second value.

In one embodiment, in the impact degree obtaining unit 9033, for each component node, a first calculating unit calculates the number of paths passing through the critical path of at least one path from the component node to the application node as a first value of the component node, and a second calculating unit calculates a distance value of the at least one path from the component node to the application node, wherein the maximum distance value is taken as a second value of the component node.

In another embodiment, in the impact degree obtaining unit 9033, firs a selecting unit selects at least one related component node having the inter-node relationship with the component nodes of the critical path. Then for each component node in a node set comprising the component nodes of the critical path and the at least one related component node, a first calculating unit calculates the number of paths passing through the critical path of at least one path from the component node to the application node, as a first value of the component node. Meanwhile, a second calculating unit calculates a distance value of the at least one path from the component node to the application node, wherein the maximum distance value is taken as a second value of the component node.

Then, the suspicious component generating module 904 generates a suspicious component sequence, according to the impact degrees of the plurality of component nodes obtained by the impact degree obtaining module 903.

In one embodiment, in the suspicious component generating module 904, a first sorting unit sorts the plurality of component nodes in descending order, according to the first values, to generate a first component sequence. Then a second sorting unit sorts the component nodes with the same first value of the first component sequence in descending order, according to the second values, to generate a second component sequence, and the second component sequence is taken as the suspicious component sequence.

In another embodiment, in the suspicious component generating module 904, a running status information extracting unit 9041 extracts the running status information of the plurality of component nodes from the real-time information obtained by the real-time information obtaining module 902, and anode determining unit 9042 determines the priority component nodes with the running status information exceeding a predefined threshold. Then a first sorting unit 9043 sorts the priority component nodes in descending order according to the first values to generate a first component sequence. Additionally, the first sorting unit 9043 further sorts other component nodes except the priority component nodes in descending order according to the first values to generate a third component sequence. Then a second sorting unit 9044 sorts the priority component nodes with the same first value of the first component sequence according to the second values to generate a second component sequence. Additionally, the second sorting unit 9044 further sorts the component nodes with the same first value of the third component sequence in descending order according to the second values to generate a fourth component sequence. Finally, a combining unit 9045 combines the second component sequence and the fourth component sequence in an order that the second component sequence precedes the fourth component sequence, to generate the suspicious component sequence.

It should be noted that the apparatus 900 of this embodiment can implement the method for recommending a suspicious component in problem diagnosis for the cloud application of the embodiments shown in FIG. 4 and FIG. 7.

The descriptions of the various embodiments of the present invention have been presented for purposes of illustration, but are not intended to be exhaustive or limited to the embodiments disclosed, Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for recommending a suspicious component in problem diagnosis for a cloud application, comprising:
   constructing a graph data model representing a hierarchical structure of the cloud application, wherein the graph data model comprises an application node representing the cloud application, a plurality of component nodes representing a plurality of components of the cloud application, and inter-node lines indicating inter-node relationships;
   obtaining real-time information of the cloud application, in response to detecting performance degradation of the cloud application;
   obtaining impact degrees of the plurality of component nodes on the performance degradation of the cloud application, based on the graph data model and the real-time information; and
   generating a suspicious component sequence, according to the impact degrees of the plurality of component nodes.

2. The method according to claim 1, wherein the inter-node relationships comprise at least one of the followings: a parent-child relationship for inter-layer nodes, a prior/next relationship, or a peer relationship for intra-layer nodes.

3. The method according to claim 1, wherein the obtaining of the impact degrees of the plurality of component nodes on the performance degradation of the cloud application based on the graph data model and the real-time information comprises:
   analyzing the real-time information to obtain a problem transaction with a worst performance index in the cloud application;
   determining a path comprising component nodes involved in the problem transaction as a critical path, according to the graph data model, wherein one endpoint of the critical path is the application node; and
   obtaining the impact degrees of the plurality of component nodes on the critical path, as the impact degrees of the plurality of component nodes on the performance degradation of the cloud application.

4. The method according to claim 3, wherein the analyzing of the real-time information to obtain the problem transaction with the worst performance index in the cloud application comprises:
   extracting, from the real-time information, transaction information of a proxy server node being one of the plurality of component nodes; and
   determining the problem transaction according to the transaction information of the proxy server node.

5. The method according to claim 4, wherein the worst performance index is response time.

6. The method according to claim 5, wherein the determining of the problem transaction according to the transaction information of the proxy server node comprises:
   obtaining the response time of each transaction from the transaction information;
   comparing the response time of the respective transactions with each other; and
   determining the transaction with the longest response time as the problem transaction.

7. The method according to claim 5, wherein the determining of the problem transaction according to the transaction information of the proxy server node comprises:
   obtaining the response time of each transaction from the transaction information;
   calculating a ratio of a difference between the response time of the respective transactions and its reference response time to the reference response time; and
   determining the transaction with the largest ratio as the problem transaction.

8. The method according to claim 3, wherein the obtaining of the impact degrees of the plurality of component nodes on the critical path comprises:
   calculating, for each of the plurality of component nodes, a number of paths passing through the critical path of at least one path from the component node to the application node, as a first value of the component node; and
   calculating a distance value of the at least one path from the component node to the application node, a maximum distance value being a second value of the component node;
   wherein the impact degree comprises the first value and the second value.

9. The method according to claim 3, wherein the obtaining of the impact degrees of the plurality of component nodes on the critical path comprises:
   selecting at least one related component node having the inter-node relationship with the component nodes of the critical path;
   calculating, for each component node in a node set comprising the component nodes of the critical path and the at least one related component node, a number of paths passing through the critical path of at least one path from the component node to the application node, as a first value of the component node; and
   calculating a distance value of the at least one path from the component node to the application node, a maximum distance value being a second value of the component node;
   wherein the impact degree comprises the first value and the second value.

10. The method according to claim 1, wherein the generating of the suspicious component sequence, according to the impact degrees of the plurality of component nodes comprises:
    sorting the plurality of component nodes in descending order, according to the first values, to generate a first component sequence; and
    sorting the component nodes with the same first value of the first component sequence in descending order, according to the second values, to generate a second component sequence, the second component sequence being the suspicious component sequence.

11. The method according to claim 1, wherein the generating of a suspicious component sequence, according to the impact degrees of the plurality of component nodes comprises:
    extracting, from the real-time information, running status information of the plurality of component nodes;
    determining priority component nodes with the running status information exceeding a predefined threshold;
    sorting the priority component nodes in descending order, according to the first values, to generate a first component sequence;
    sorting the priority component nodes with the same first value of the first component sequence, according to the second values, to generate a second component sequence;
    sorting other component nodes except the priority component nodes in descending order, according to the first values, to generate a third component sequence;
    sorting the component nodes with the same first value of the third component sequence in descending order, according to the second values, to generate a fourth component sequence; and
    combining the second component sequence and the fourth component sequence in an order that the second component sequence precedes the fourth component sequence, to generate the suspicious component sequence.

12. An apparatus for recommending a suspicious component in problem diagnosis for a cloud application, comprising:
    a processor; and
    a memory coupled to the processor, wherein the memory comprises instructions which, when executed by the processor, cause the processor to:
    construct a graph data model representing a hierarchical structure of the cloud application, wherein the graph data model comprises an application node representing the cloud application, a plurality of component nodes representing a plurality of components of the cloud application, and inter-node lines indicating inter-node relationships;
    obtain real-time information of the cloud application, in response to detecting performance degradation of the cloud application;
    obtain impact degrees of the plurality of component nodes on the performance degradation of the cloud application, based on the graph data model and the real-time information; and
    generate a suspicious component sequence, according to the impact degrees of the plurality of component nodes.

13. The apparatus according to claim 12, wherein the instructions to obtain the impact degrees of the plurality of component nodes on the performance degradation of the cloud application based on the graph data model and the real-time information further cause the processor to:
    analyze the real-time information to obtain a problem transaction with a worst performance index in the cloud application;
    determine a path comprising component nodes involved in the problem transaction as a critical path, according to the graph data model, wherein one endpoint of the critical path is the application node; and
    obtain the impact degrees of the plurality of component nodes on the critical path, as the impact degrees of the plurality of component nodes on the performance degradation of the cloud application.

14. The apparatus according to claim 13, wherein the instructions to analyze of the real-time information to obtain the problem transaction with the worst performance index in the cloud application further cause the processor to:

extract, from the real-time information, transaction information of a proxy server node being one of the plurality of component nodes; and
determine the problem transaction according to the transaction information of the proxy server node.

15. The apparatus according to claim 14, wherein the worst performance indicator is response time.

16. The apparatus according to claim 15, wherein the instructions to determine of the problem transaction according to the transaction information of the proxy server node further cause the processor to:
obtain the response time of each transaction from the transaction information;
compare the response time of the respective transaction with each other, and
determine the transaction with the longest response time as the problem transaction.

17. The apparatus according to claim 15, wherein the instructions to determine of the problem transaction according to the transaction information of the proxy server node further cause the processor to:
obtain the response time of each transaction from the transaction information;
calculate a ratio of a difference between the response time of the respective transactions and its reference response time to the reference response time; and
determine the transaction with the largest ratio as the problem transaction.

18. The apparatus according to claim 13, wherein the instructions to obtain of the impact degrees of the plurality of component nodes on the critical path further cause the processor to:
calculate, for each of the plurality of component nodes, a number of paths passing through the critical path of at least one path from the component node to the application node as a first value of the component node; and
calculate a distance value of the at least one path from the component node to the application node, wherein a maximum distance value is taken as a second value of the component node;
wherein the impact degree comprises the first value and the second value.

19. The apparatus according to claim 13, wherein the instructions to obtain of the impact degrees of the plurality of component nodes on the critical path further cause the processor to:
select at least one related component node having the inter-node relationship with the component nodes of the critical path;
calculate, for each component node in a node set comprising the component nodes of the critical path and the at least one related component node, a number of paths passing through the critical path of at least one path from the component node to the application node, as a first value of the component node; and
calculate a distance value of the at least one path from the component node to the application node, wherein a maximum distance value is taken as a second value of the component node;
wherein the impact degree comprises the first value and the second value.

20. The apparatus according to claim 12, wherein the instructions to generate the suspicious component sequence, according to the impact degrees of the plurality of component nodes further causes the processor to:
sort the plurality of component nodes in descending order, according to the first values, to generate a first component sequence; and
sort the component nodes with the same first value of the first component sequence in descending order, according to the second values, to generate a second component sequence, wherein the second component sequence is taken as the suspicious component sequence.

21. The apparatus according to claim 12, wherein the instructions to generate the suspicious component sequence, according to the impact degrees of the plurality of component nodes further causes the processor to:
extract running status information of the plurality of component nodes from the real-time information;
determine priority component nodes with the running status information exceeding a predefined threshold;
sort the priority component nodes in descending order according to the first values to generate a first component sequence, and sort other component nodes except the priority component nodes in descending order according to the first values to generate a third component sequence;
sort the priority component nodes with the same first value of the first component sequence according to the second values to generate a second component sequence, and sort the component nodes with the same first value of the third component sequence in descending order according to the second values to generate a fourth component sequence; and
combine the second component sequence and the fourth component sequence in an order that the second component sequence precedes the fourth component sequence, to generate the suspicious component sequence.

22. A computer program product comprising a non-transitory computer readable storage medium having a computer readable program stored therein, wherein the computer readable program, when executed on a computing device, causes the computing device to:
construct a graph data model representing a hierarchical structure of the cloud application, wherein the graph data model comprises an application node representing the cloud application, a plurality of component nodes representing a plurality of components of the cloud application, and inter-node lines indicating inter-node relationships;
obtain real-time information of the cloud application, in response to detecting performance degradation of the cloud application;
obtain impact degrees of the plurality of component nodes on the performance degradation of the cloud application, based on the graph data model and the real-time information; and
generate a suspicious component sequence, according to the impact degrees of the plurality of component nodes.

* * * * *